United States Patent [19]
Yang

[11] Patent Number: 5,141,578
[45] Date of Patent: Aug. 25, 1992

[54] EVA INSOLE MANUFACTURING PROCESS

[76] Inventor: Kuo-Nan Yang, No. 1, Alley 104, Lane 270, Hsueh Shih Rd., North Area, Taichung, Taiwan

[21] Appl. No.: 619,572

[22] Filed: Nov. 29, 1990

[51] Int. Cl.⁵ .............................................. B29C 67/22
[52] U.S. Cl. ...................................... 156/79; 156/245; 264/45.1; 264/46.4; 264/245; 264/328.1
[58] Field of Search ............... 156/79, 245; 264/55, 264/45.1, 244, 328.1, 51, 245, 46.4, 46.6

[56] References Cited

U.S. PATENT DOCUMENTS

| | | | |
|---|---|---|---|
| 3,705,934 | 12/1972 | Giannini | 156/79 |
| 3,985,853 | 10/1976 | Weisberg | 264/45.1 |
| 4,012,380 | 5/1977 | Nuttall | 264/55 |
| 4,594,283 | 6/1986 | Ohigashi | 156/296 |
| 4,648,923 | 3/1987 | Chapnick | 156/245 |
| 4,674,204 | 6/1987 | Sullivan et al. | 264/244 |

FOREIGN PATENT DOCUMENTS 57-025925  2/1982  Japan ............................ 264/55

Primary Examiner—Robert A. Dawson
Assistant Examiner—Allan R. Kuhns
Attorney, Agent, or Firm—Varndell Legal Group

[57] ABSTRACT

An EVA insole manufacturing process includes a step of mixing an EVA resin with a foaming agent for producing a molding through an injection molding process, and a step of heating the molding thus obtained in a mold so that it foams into a predetermined shape. Two or more moldings which respectively contain a different concentration of foaming agent or a different pigment color may be put together in a common mold and subjected to integral foaming and form setting process, so as to produce an insole which has different hardness and color at different parts thereof.

3 Claims, 2 Drawing Sheets

EVA INSOLE MANUFACTURING PROCESS

BACKGROUND OF THE INVENTION:

The present invention relates to an EVA (ethylene vinyl acetate copolymer resin) insole manufacturing processes, and more particularly to an EVA insole manufacturing process where an EVA resin is mixed with a foaming agent for making a molding by an injection molding machine, and the thus obtained molding is foamed in a mold, so as to obtain an insole immediately after form setting without any further cutting, trimming or grinding procedure.

In a conventional EVA insole manufacturing process, an EVA resin is mixed with a foaming agent, and the mixture is then squeezed into strips. The EVA material strips are then placed in a hot press and subjected to a foaming process. After foaming, the foamed EVA strips are placed in a water cooling trough for cooling. After cooling, the foamed EVA strips are cut and trimmed, or sometimes, some pieces of trimmed EVA pieces are adhered together. After passing through a grinding process, the EVA strips thus obtained are placed in a hydraulic machine for form setting. Thus, a whole EVA insole manufacturing process is completed. This EVA insole manufacturing process is not satisfactory, because of the following disadvantages:

1. It requires much human power. In a complete production line, there are generally more than 30 experienced workers required.

2. Much waste material is produced. Because EVA strips are cut and sheared after the foaming process, approximately 40% or more of the foamed EVA strips are cut off and become useless. Disposal of the waste material is still a problem to settle, and it may cause environmental pollution.

3. It consumes much time (about 3 or more days) to produce a specific style of an EVA insole. Therefore, it is not suitable for producing various styles or designs of EVA insoles at a time.

4. If an insole is comprised of several EVA strips of different hardness bound together, an insole may tear easily due to weak structural strength.

SUMMARY OF THE INVENTION

The present invention has been accomplished to eliminate the aforesaid problems. It is therefore, an object of the present invention to provide an EVA insole manufacturing process which consumes less human power. It is another object of the present invention to provide an EVA insole manufacturing process which can greatly increase production capacity. It is still another object of the present invention to provide an EVA insole manufacturing process which can fully utilize EVA material, and greatly reduce manufacturing loss.

BRIEF DESCRIPTION OF THE DRAWINGS

The present invention will now be described by way of examples, with reference to the annexed drawings, in which.

DETAILED DESCRIPTION OF THE PREFERRED EMBODIMENT:

An EVA (ethylene vinyl acetate copolymer resin) insole manufacturing process of the present invention is outlined hereinafter, with reference to the annexed drawings.

EVA resin is proportionally mixed with a foaming agent and then squeezed into a flat block. The flat block thus obtained is broken into pieces by a crusher or the like. The small pieces of EVA material are used as a supply of material for making moldings 10 through an injection molding process. Each molding 10 is then placed in a mold and heated so that it foams. After the foaming process in the mold by use of a heat press, the foamed molding is removed from the mold and then, placed in a hydraulic machine for form setting. After form setting, a finished insole 20 is made.

Figure 1:
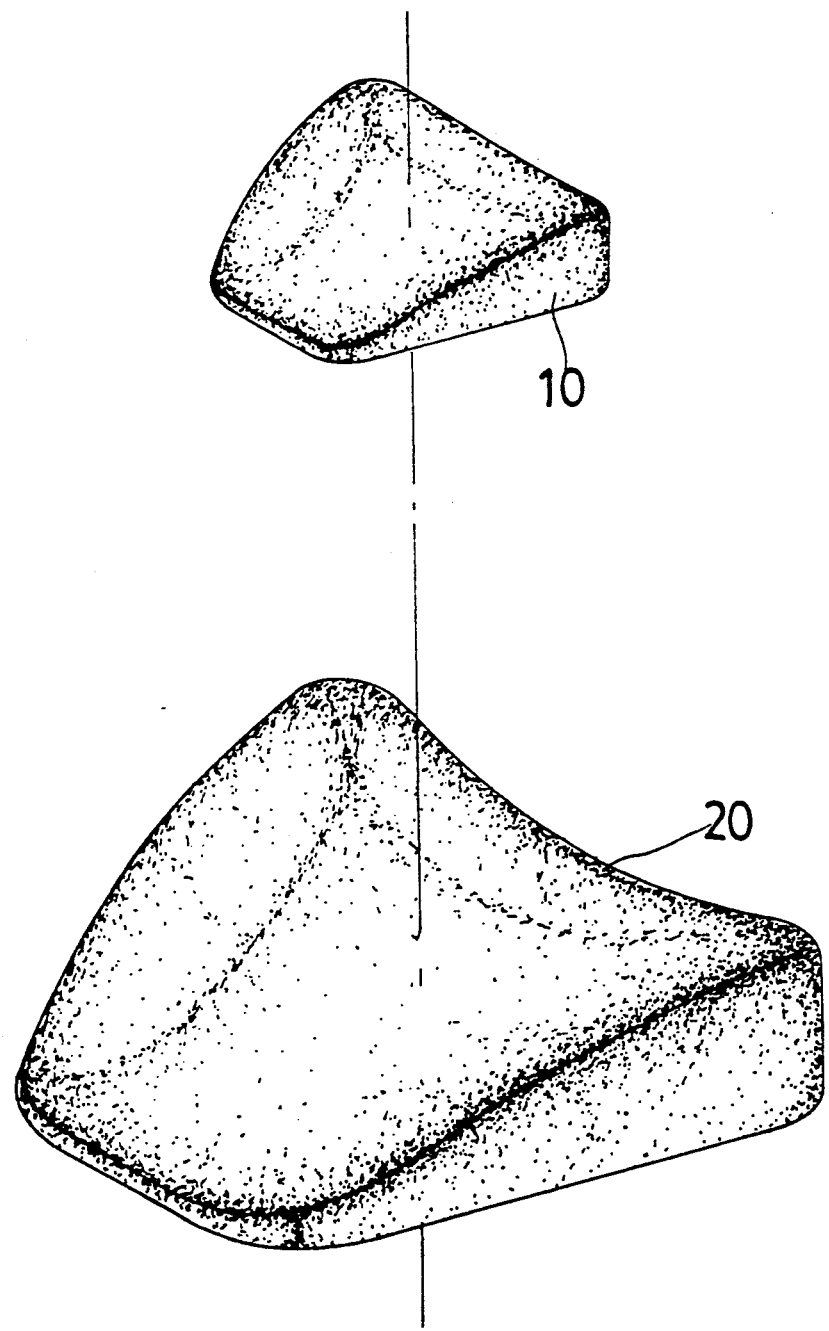
FIG. 1 illustrates a molding which is made of an EVA resin through an injection molding process, and an insole which is made of a molding through foaming and form setting processes.
Figure 2:
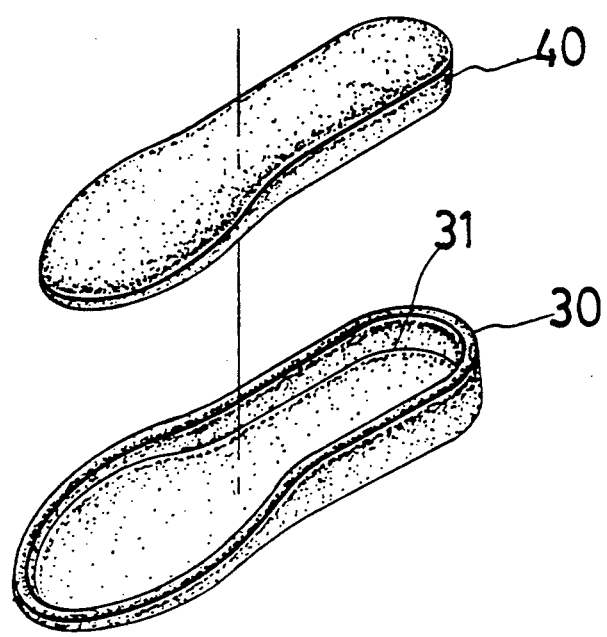
FIG. 2 illustrates two different moldings according to the present invention.
Figure 3:
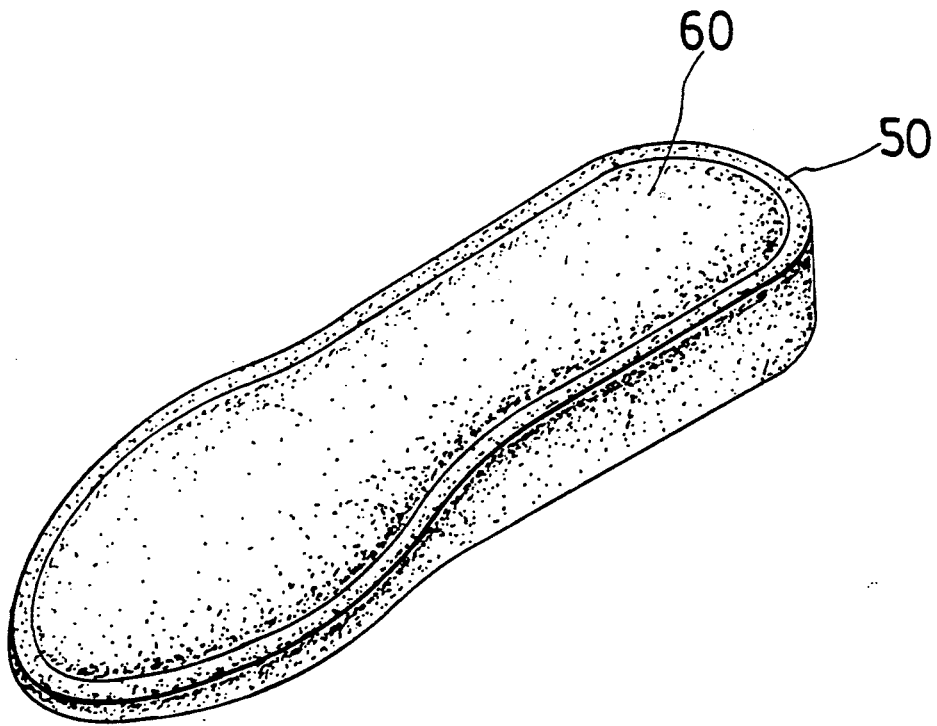
FIG. 3 illustrates an integral insole made of two different moldings according to the present invention.

According to the present invention, an insole may be so made that its different parts have different hardnesses. As shown in FIG. 2, two separate moldings 30, 40 are respectively made of different EVA materials through an injection molding process, wherein the EVA material for making a first molding 30 contains a foaming agent in a concentration different from the EVA material used for making a second molding 40. Further, the EVA material for making a first molding 30 may contain a pigment color which is different from the EVA material for making a second molding 40. After injection, the first molding 30 defines therein a trough 31 for receiving the second molding 40, so that the second molding 40 can be placed inside the first molding 30 and then both the first and second moldings are put into a mold of a hot press for foaming into an integral molding. After form setting of the integral molding, an insole is made. The insole thus obtained has an unitary inner part 60 and outer part 50 in different hardness and/or color.

As described above, an EVA insole in accordance with the present invention is made of EVA moldings through foaming and shape molding processes, which EVA moldings are made of EVA material chips containing different concentrations of an EVA resin and a foaming agent and which are formed through an injection molding process. After foaming and shape molding processes an insole is completely made without any further cutting, shearing, binding or grinding process. Different parts of an insole can be made in different hardness and different color, as desired.

I claim:

1. An insole manufacturing process comprising:
   (i) forming a first molding and a second molding respectively by the steps of:
      (a) mixing an ethylene vinyl acetate resin with a foaming agent according to a predetermined proportion, and squeezing the resulting mixture into a flat block;
      (b) crushing the flat block into pieces and respectively injection molding the pieces into the first molding and the second molding, so that the first molding has an opening for receiving the second molding;
   (ii) placing the second molding within the opening of the first molding and heat foaming both the first and second moldings together in a mold to form an integral molding; and
   (iii) form setting the integral molding into an insole.

2. The process of claim 1, wherein the first and second moldings contain different concentrations of foaming agent.

3. The process of claim 1, wherein the first and second moldings contain different pigment colors.

* * * * *